Patented Feb. 15, 1949

2,461,896

UNITED STATES PATENT OFFICE 2,461,896

PREPARATION OF CRYSTAL VIOLET

Guy Scott Herrick, Bound Brook, N. J., assignor to American Cyanamid Company, New York, N. Y., a corporation of Maine No Drawing. Application July 20, 1945, Serial No. 606,284

11 Claims. (Cl. 260—391)

This invention relates to a process for obtaining crystal violet and mixtures of crystal violet with its zinc chloride double salt in an anhydrous crystalline form, and more particularly in the form of crystals which have solubility properties in alcoholic solvents to make them especially suitable for use in the hectographic solvent process.

The term crystal violet used in this specification and in the appended claims is intended to cover the chloride derived from hexamethyltriaminotriphenylcarbinol having the emprical formula $(C_{25}H_{30}N_3)Cl$ and the structural formula given in the color index No. 681. However, the invention is applicable also to the zinc chloride double salt of crystal violet and to mixtures of the zinc double salt with the chloride, as well as the chloride used alone.

In the widely used hectographic solvent process for copy duplication, several hundred copies of an original manuscript are made by typing or writing against paper coated with a waxy substance admixed with crystal violet dye, so that a mirror-reverse dye imprint is formed. The master copy having the imprint is placed on a revolvable metal drum and the mirror image dye imprint is contacted successively with copy sheets which have been pre-moistened with an alcoholic solvent. The solvent dissolves a part of the dye, thus causing transfer of some of the dye from the master imprint to each copy sheet.

The hectographic paper, which is really used as a kind of carbon paper, is usually prepared by incorporating crystal violet in a hot mixture of waxy and oily substances which melt sufficiently low so that the dyestuff is not damaged at their melting point. They must, however, have a sufficiently high melting point to permit the use of the paper in summer. Coating is effected by producing an intimately ground mixture of the dye and waxy substances of a uniform paste-like mass which, when melted, is sufficiently liquid to coat the paper.

The number of copies which can be made from the master sheet, and their brightness and clearness, are limited by the amount of dye deposited, and more particularly by the solubility characteristics of the dye in the alcoholic solvent used. Since the dye remains in its original crystalline form on the coated paper, the number of copies from a single image of the matter to be reproduced can be increased beyond a certain limit mainly by improvement in the physical characteristics of the dye used for the coating. To get the maximum number of uniform copies of even intensity throughout the duplication process, it is necessary that the dye be very gradually exhausted at a uniform rate by the alcoholic solvent.

A practical test for the effectiveness of a given sample of crystal violet for hectographic purposes is the so-called "tea bag method". This test is carried out as follows. A crystal violet sample is ground and brushed through a 170 mesh sieve. A 5 gram sample is then weighed and placed in the center of a four inch square of white cotton cloth, which is then folded into a compact "tea bag." The tea bag is wired to a stirrer placed in a 600 cc. tall type beaker and 600 cc. of ethanol containing 5 to 6% of water and 5 to 6% of methanol added. The sample is then stirred mechanically at a moderate rate at room temperature and at given intervals of time pipetted samples are removed and titrated with titanium trichloride solution to determine the amount of crystal violet.

A poor hectographic grade of crystal violet dye will have a high rate of solubility at the start, whereas a good hectographic grade of the dye will have a very low rate. The total amount of crystal violet dissolved at the end of a given time interval up to final exhaustion will always be greater in the case of the poor grade. This means that when a poor grade of crystal violet dye is used in hectographic carbon paper, the first copies from the master sheet will get more dye and only a few copies can be made. When good hectographic quality is used, less dye is transferred on the first copies with the result that a greater number of more uniform copies are obtained.

Crystal violet produced by the various known processes is finally crystallized from an aqueous medium and contains up to nine mols of water of crystallization. This hydrated form, while useful for many other applications, is unsatisfactory for hetographic inks because it shows too high solubility in alcohol. It is possible to dehydrate the crystal violet by heating the crystals at temperatures above about 85° C. but below the point at which the dyestuff decomposes. This product, however, suffers from several important disadvantages. The dehydrated material resulting from expelling the water of crystallization gives a porous, somewhat cake-like, non-uniform mass containing agglomerates, which still has too great an alcohol solubility, resulting in a fewer number of non-uniform copies when used for the hectographic master copy, as previously discussed. Furthermore, it also has a high oil absorption, and when added to the mixture of oily and waxy materials used for coating the hectographic paper, gives a buttery, non-workable mass which will not spread properly on the paper to give a uniform deposit on imprint. It also has a great tendency, on account of its porosity and the large surface area exposed, to take up atmospheric moisture, probably forming the hydrated salt, which increases the alcohol solubility and also increases the tendency of the paper to curl when in use due to variations in atmospheric moisture.

It has also been proposed to dissolve the purified dye in hot ethyl alcohol and then distill off the alcohol. The product resulting from this process has the disadvantage of not having a well-crystallized form and also does not have the proper solubility characteristics.

A large demand exists for a hectographic grade crystal violet which will have the optimum solubility characteristics, which will "age" well, i. e., have a reduced tendency to become adversely affected by atmospheric influences, and which will have the proper physical characteristics for use in preparing the coating material for the hectographic sheet.

According to the present invention crystal violet is prepared in a new physical form by direct crystallization of the anhydrous crystals. The product is an anhydrous, dense, compact, crystalline substance with a smooth surface and minimum surface area, which results in a low solubility rate in alcohol, low oil absorption, and decreased sensitivity to atmospheric moisture. This crystallization is effected by producing a solution of dehydrated crystal violet in a liquid nitrohydrocarbon solvent having not more than ten carbon atoms which may be a nitroparaffin or a nitrohydrocarbon of the benzene series. The solvents must, of course, be liquid at room temperatures and should not decompose appreciably at temperatures below 200° C. under atmospheric pressure. Representative members of this group of solvents are: nitromethane, nitroethane, 1-nitropropane, 2-nitropropane, 1-nitrobutane, 1-nitropentane, 1-nitrohexane, 2-nitrohexane, 2-nitro-2,3-dimethylbutane, 1-nitroheptane, 2-nitroheptane, 3-nitro-2,2-dimethylpentane, 2-nitro-2,4-dimethylpentane, 1-nitrooctane, 2-nitrooctane, nitrobenzene, liquid mononitrotoluenes, liquid mononitroxylenes and the mononitro-ethylbenzenes. Mixtures of these solvents may be used such as, for example, mixtures of the nitration products of crude commercial xylenes, toluenes, cumenes or cymenes.

While it is possible to produce the improved crystal violet of the present invention by cooling a solution of anhydrous crystal violet in the nitrohydrocarbon, even better results are obtained by a very rapid crystallization effected by diluting the nitrohydrocarbon with a miscible solvent which shows less solubility for the anhydrous crystal violet than does the nitrohydrocarbon. This sudden crystallization is referred to as a "shock out" procedure. The precipitation may be effected from the hot solution or the solution may first be cooled. The step requires no critical control and a simple and reliable process is thus possible. Typical "shocking out" diluents are hydrocarbons, chlorinated hydrocarbons, such as benzene, monochlorobenzene, tetrachlorethylene, etc.

The improved product obtainable by the preferred "shock out" procedure is quite different than would ordinarily be expected. As a general thing rapid precipitation tends to produce tiny, poorly defined crystals, and even in many cases, amorphous material. In the present process large, well defined crystals are obtained which show optimum physical characteristics for use in the hectographic process.

It is possible to dehydrate crystal violet before dissolving in the nitrohydrocarbon. This, however, is not necessary, as it is possible to combine dehydration and solution in a single step. The hydrated crystal violet is introduced in the nitrohydrocarbon and water removed by azeotropic distillation.

When crystal violet of good chemical purity is used the solvent can be recycled, which represents a marked saving in processing costs. Even when crystallization by the "shock out" procedure is used, the presence of the second solvent does not introduce serious difficulties, as the two solvents can usually be sufficiently separated by distillation for reuse. It should be noted that it is not necessary to obtain absolutely pure nitrohydrocarbon. The presence of very small amounts of the "shock out" diluent will not adversely affect the process, which permits reuse of the solvents with a comparitively cheap and simple distillation.

The crystals of anhydrous crystal violet can be recovered and freed from adhering solvent in any suitable manner. A preferred method is to filter by suction, wash with an inert solvent, and dry in a vacuum or air dryer at approximately 80–90° C. The solvent used for washing is preferably non-inflammable and non-explosive, and also have the least possible solvent action on the crystals at the drying temperature employed, in order that the smooth surfaces of the crystals will not be roughened by partial solution and subsequent evaporation.

Commercial crystal violet prepared by the "phosgene" process, that is, by the direct action of phosgene on dimethylaniline in the presence of zinc chloride, is usually a mixture of the chloride of the base with small amounts of zinc chloride double salt. The process of this invention is applicable to the chloride salt alone or to the zinc chloride double salt alone, but it is best suited to a mixture of the two. Improved results are often realized by using a dye containing an amount of the zinc chloride double salt so that the mixture analyzes up to 4% zinc by weight. Small amounts of the zinc chloride double salt tend to reduce the over-all solubility, and its addition in small quantities may be used as a means of adjusting solubility. Any very substantial addition of the zinc chloride double salt, however, acts to reduce the dye strength. Therefore, the total amount must be carefully regulated to give optimum results. In case a mixture is desired this may be obtained either by adding zinc chloride in an insufficient amount to form the double salt entirely, or by separately preparing the chloride and the double salt and then mixing the two mechanically. Data are given in the table below on the comparison of rates of solution comparing the alcohol solubility of zinc-free crystal violet with that of a mechanical mixture containing 1.8% zinc.

The crystal violet dye obtained by the process of my invention is particularly suitable for use in the hectographic solvent process whether used alone, as is usually the practice, or when used in admixture with other dyes of similar character.

The invention will be described in greater detail in conjunction with the following specific examples. The parts are by weight.

EXAMPLE I

One hundred parts of a dehydrated mixture of crystal violet and its zinc chloride double salt of approximately 1.8% zinc content are dissolved in 300 parts of nitrobenzene at 85° C. 300 parts of chlorobenzene at 85° C. are added slowly with stirring. The slurry of crystals is filtered at room temperature, washed with 100 parts of chlorobenzene and then air-dried at 80–85° C.

The combined filtrate and washes are distilled at 85° C. under reduced pressure. The distillate consists chiefly of chlorobenzene which can be reused in the process. The solution of dye in nitrobenzene remaining in the flask can be used as the solvent for subsequent crystallization.

EXAMPLE II

A solution of 600 parts of a dehydrated mixture of crystal violet and its zinc chloride double salt of approximately 1.8% zinc content, in 1500 parts of nitrobenzene at 85° C. are added slowly with stirring to 2400 parts of tetrachloroethylene. The mixture is allowed to stand for a short time to crystallize. The crystals are washed with small portions of tetrachloroethylene and air-dried at 80–90° C. A good yield is obtained of the anhydrous crystalline form of dye which has excellent physical properties for hectographic purposes. The same results are obtained when chlorobenzene is substituted for the tetrachlorethylene.

EXAMPLE III

One hundred fifty parts of a dehydrated mixture of crystal violet and its zinc chloride double salt containing approximately 1.8% zinc, are dissolved in 100 parts of nitromethane at 95° C. and the mixture allowed to cool gradually to 35° C. The crystals are then filtered by suction, washed on the filter with several portions of tetrachloroethylene and dried in a vacuum dryer at 75° C. A good yield of the anhydrous crystalline form of dye is obtained.

EXAMPLE IV

One hundred fifty parts of a dehydrated mixture of crystal violet and its zinc chloride double salt containing approximately 1.8% zinc, are dissolved in 150 parts of nitrobenzene at 95° C. and the mixture allowed to cool gradually to 35° C. The crystals are then recovered as in Example III.

EXAMPLE V

Wet crystals of a hydrated mixture of crystal violet and its zinc chloride double salt containing 100 parts of real dye analyzing approximately 1.8% zinc, as determined by titration with titanium trichloride solution, are dissolved in 300 parts of nitrobenzene. Part of the solvent and the water are removed by vacuum distillation at 28″ pressure until the temperature in the solution reaches 85° C. 300 parts of tetrachloroethylene are then added and the mixture stirred at approximately 85° C. for a short time and filtered. The crystals are washed with several portions of tetrachloroethylene and then air-dried at 85° C. The anhydrous crystalline form of dye obtained is particularly suitable for the hectographic solvent process.

Various products prepared by the methods indicated were tested by the "tea bag" method, the rates of solution appearing in the following table:

*Comparison of rates of solution*

| Sample | | Solubility (grams/100 cc.) | | | |
|---|---|---|---|---|---|
| | | 1 min. | 3 min. | 5 min. | 7 min. |
| 1 | Dehydrated zinc-free crystal violet, air-dried | 0.37 | 0.58 | 0.60 | (¹) |
| 2 | Zinc-free crystal violet dehydrated by distillation of an alcohol solution under vacuum at 75° C | 0.29 | 0.56 | 0.64 | (¹) |
| 3 | Zinc-free crystal violet crystallized according to Example 1 | 0.16 | 0.38 | 0.53 | 0.65 |
| 4 | Mechanical mix of dehydrated zinc-free and zinc salt, the mixture analyzing 1.8% of zinc | 0.09 | 0.26 | 0.42 | 0.51 |
| 5 | Sample 4 crystallized according to Example 1 | 0.02 | 0.05 | 0.08 | 0.11 |
| 6 | Product of Example 2 | 0.06 | 0.14 | 0.25 | 0.33 |
| 7 | Product of Example 3 | .04 | .09 | .12 | .15 |
| 8 | Product of Example 4 | .03 | .09 | .15 | .20 |
| 9 | Product of Example 5 | .02 | .03 | .05 | .06 |

¹ Exhausted.

It will be noted that with both crystal violet and mixtures of crystal violet with its zinc chloride double salt, the dehydrated salts show much higher solubility rates than do the corresponding products crystallized according to the present invention. In the case of the zinc free crystals the present invention shows rates of solubility less than 0.4 at the end of three minutes and less than 0.2 at the end of one minute. In the case of zinc products the solution rates at the end of seven minutes vary from .06 gram to a maximum of .33 gram, with an average not exceeding .2, as compared with .51 gram for the mechanically mixed dehydrated products.

I claim:

1. A process for preparing an anhydrous triarylmethane dye having a uniform slow rate of solubility in alcoholic solvents, which comprises crystallizing a dehydrated dye material selected from the group consisting of crystal violet and mixtures of crystal violet with the zinc chloride double salt thereof, from a solvent selected from the group consisting of nitroparaffins having not more than ten carbon atoms, nitrobenzene and its homologues having not more than ten carbon atoms, and mixtures thereof, the selected solvent being liquid at room temperature.

2. A process for preparing an anhydrous triarylmethane dye having a uniform slow rate of solubility in alcoholic solvents, which comprises dissolving a dehydrated dye material selected from the group consisting of crystal violet and mixtures of crystal violet with the zinc chloride double salt thereof, in a solvent selected from the group consisting of nitroparaffins having not more than ten carbon atoms, nitrobenzene and its homologues having not more than ten carbon atoms, and mixtures thereof, the selected solvent being liquid at room temperature, and crystallizing out the dye material on cooling.

3. A process for preparing an anhydrous triarylmethane dye having a uniform slow rate of solubility in alcoholic solvents, which comprises dissolving a dehydrated dye material selected from the group consisting of crystal violet and mixtures of crystal violet with the zinc chloride double salt thereof, in a hot solvent selected from the group consisting of nitroparaffins having not more than ten carbon atoms, nitrobenzene and its homologues having not more than ten carbon atoms, and mixtures thereof, the selected solvent being liquid at room temperature, adding to this solution an anhydrous organic diluent miscible with the organic solvent and having less solvent action on the dye material than said selected solvent and then crystallizing out the dye material in an anhydrous crystalline form.

4. A method according to claim 3 in which the solvent and diluent are nitrobenzene and chlorobenzene respectively.

5. A method according to claim 3 in which the solvent and diluent are nitrobenzene and tetrachloroethylene respectively.

6. A process for preparing an anhydrous triarylmethane dye having a uniform slow rate of solubility in alcoholic solvents, which comprises crystallizing a mixture of dehydrated crystal violet and its zinc chloride double salt, the mixture analyzing 1-4% zinc by weight, from a solvent selected from the group consisting of nitroparaffins having not more than ten carbon atoms, nitrobenzene and its homologues having not more than ten carbon atoms, and mixtures thereof, the selected solvent being liquid at room temperatures.

7. A process for preparing an anhydrous triarylmethane dye having a uniform slow rate of solubility in alcoholic solvents, which comprises crystallizing a mixture of dehydrated crystal violet and its zinc chloride double salt, the mixture analyzing 1-4% by weight, from a solvent selected from the group consisting of nitroparaffins having not more than ten carbon atoms, nitrobenzene and its homologues having not more than ten carbon atoms, and mixtures thereof, the selected solvent being liquid at room temperature, adding to this solution an anhydrous organic diluent having less solvent action on the dye material than said selected solvent, and then crystallizing out the dye material in an anhydrous crystalline form.

8. A method according to claim 7 in which the solvent and diluent are nitrobenzene and chlorobenzene respectively.

9. A method according to claim 7 in which the solvent and diluent are nitrobenzene and tetrachlorethylene respectively.

10. A process for preparing an anhydrous triarylmethane dye having a uniform slow rate of solubility in alcoholic solvents, which comprises dissolving a dehydrated dye material selected from the group consisting of crystal violet and mixtures of crystal violet with the zinc chloride double salt thereof in a solvent selected from the group consisting of nitroparaffins having not more than ten carbon atoms, nitrobenzene and its homologues having not more than ten carbon atoms, and mixtures thereof, the selected solvent being liquid at room temperature, and crystallizing out the dye material on cooling, said dehydrated dye material having been prepared from a hydrated dye material selected from the group consisting of crystal violet and mixtures of crystal violet with the zinc chloride double salt thereof, by dissolving in one of the said selected solvents and azeotropically distilling to remove the water.

11. A method according to claim 10 in which the solvent is nitrobenzene.

GUY SCOTT HERRICK.

REFERENCES CITED

The following references are of record in the file of this patent:

UNITED STATES PATENTS

| Number | Name | Date |
| --- | --- | --- |
| 1,955,080 | Mills | Apr. 17, 1934 |
| 2,096,871 | Atkins | Oct. 26, 1937 |
| 2,124,590 | Reed | Jan. 26, 1938 |
| 2,193,336 | Lecher | Mar. 12, 1940 |
| 2,204,059 | Acken | June 11, 1940 |
| 2,209,019 | Slagh | July 23, 1940 |
| 2,347,660 | Burtle | May 2, 1944 |
| 2,389,228 | Wyler | Nov. 20, 1945 |

OTHER REFERENCES

Haas et al., "Chemical Reviews," vol. 32, p. 389 (1943).